Figure 1:
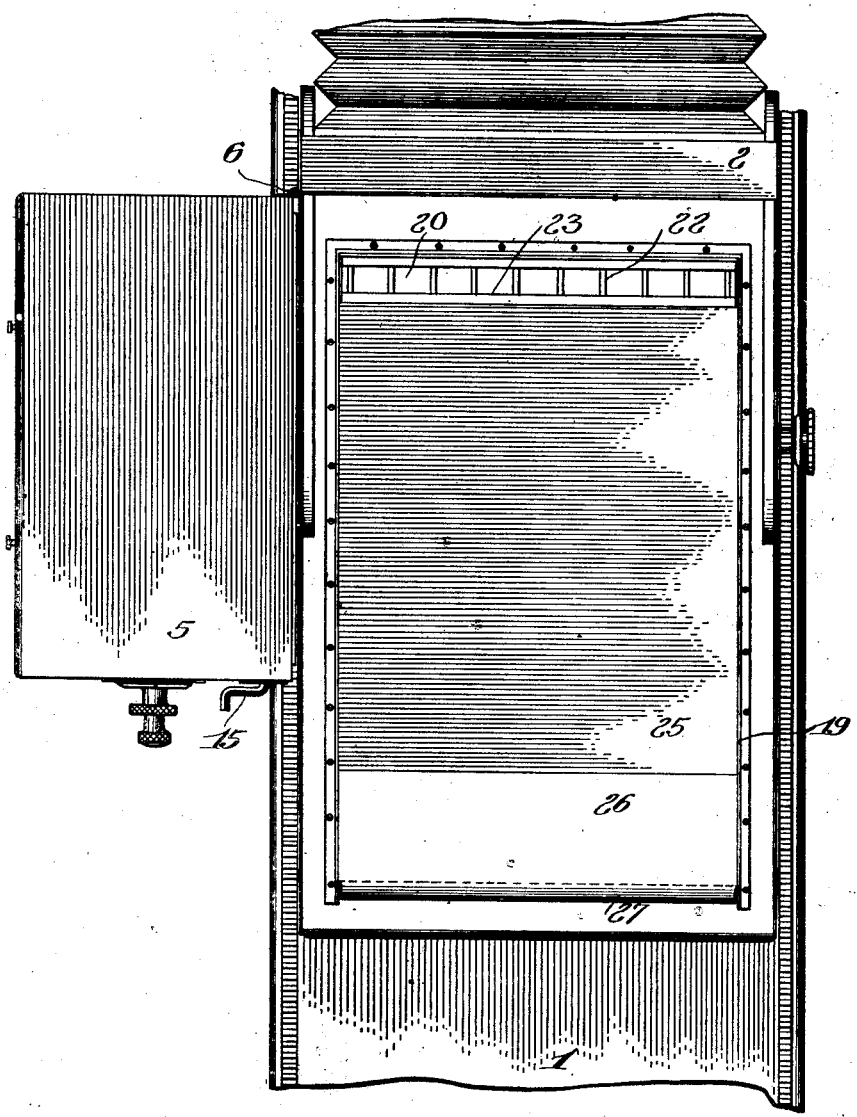

J. S. GREENE.
PRINT STORAGE EQUIPMENT FOR CAMERAS.
APPLICATION FILED OCT 8, 1920.

Patented May 16, 1922.

INVENTOR.
BY John S. Greene
his ATTORNEY.

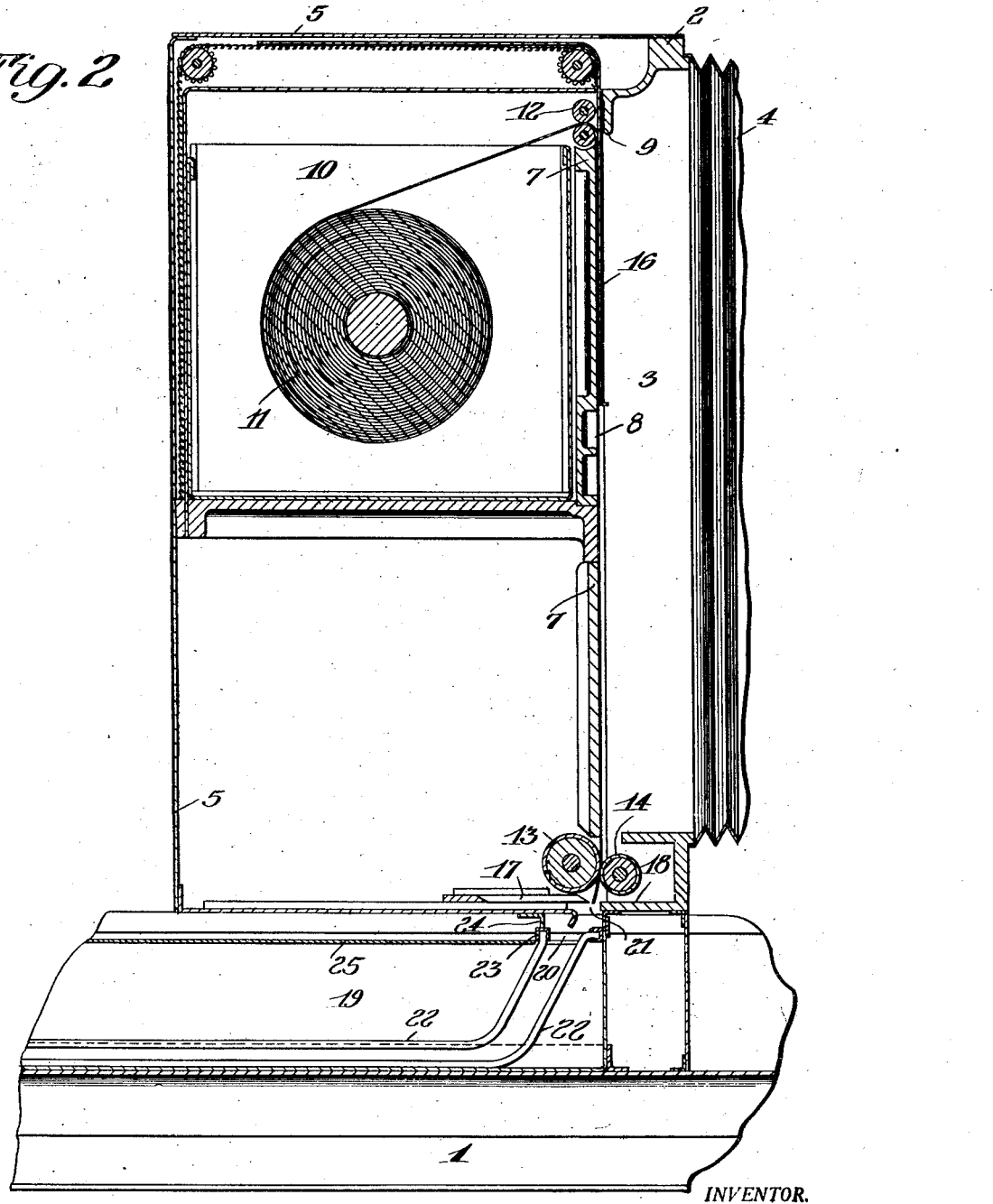

UNITED STATES PATENT OFFICE.

JOHN S. GREENE, OF ROCHESTER, NEW YORK, ASSIGNOR TO PHOTOSTAT CORPORATION, OF PROVIDENCE, RHODE ISLAND, A CORPORATION OF RHODE ISLAND.

PRINT-STORAGE EQUIPMENT FOR CAMERAS.

1,416,193.  Specification of Letters Patent.  Patented May 16, 1922.

Application filed October 8, 1920. Serial No. 415,503.

*To all whom it may concern:*

Be it known that I, JOHN S. GREENE, of Rochester, in the county of Monroe and State of New York, have invented certain new and useful Improvements in Print - Storage Equipments for Cameras; and I do hereby declare the following to be a full, clear, and exact description of the same, reference being had to the accompanying drawings, forming a part of this specification, and to the reference numerals marked thereon.

My present invention relates to photography and more particularly to photographic cameras of the type in which a continuous roll of sensitive material such as film or photographic paper is fed through the focal plane, severed and passed into either a storage or a developing receptacle associated with the camera and the invention has for its object to improve the combination of receptacle and camera body to the end that the device may be more compact and convenient and at the same time protect the prints against fogging. To these and other ends the invention resides in certain improvements and combinations of parts all as will be hereinafter more fully described the novel features being pointed out in the claims at the end of the specification.

In the drawings:

Figure 1 is a top plan fragmentary view of a camera and print receptacle constructed in accordance with and illustrating one embodiment of my invention, the rear portion of the camera body being shown swung to inoperative or open position, and Figure 2 is a vertical central section with the parts in normal position.

Similar reference numerals throughout the several views indicate the same parts.

The camera shown in the present embodiment of the invention is of the type known as "commercial" cameras which, except for focusing purposes, are fixed upon a supporting table 1 and in the present instance, the camera comprises a two-part body portion consisting of a fixed forward portion 2 enclosing the exposure or dark chamber 3 to which the bellows 4 is secured and a rearward movable portion 5 hinged to the forward portion at 6 to swing laterally, as shown in Figure 1, from light-tight cooperation with the forward portion shown in Figure 2. The front of the rearward portion 5 presents a wall 7 for supporting and disposing a strip of sensitive material 8 in the focal plane of the camera in rear of the exposure opening 9 at the rear of the forward fixed portion 2. In other words, the parting line between the sections of the body is substantially the focal plane of the camera.

In the upper portion of the section 5 is a roll holding chamber 10 containing the roll 11 of film or paper. The latter passes out at the front and top between guide rolls 12 and thence downwardly as at 8 across the support 7 and between two rubber feed rolls 13 and 14. The latter roll is carried on the section 2 and the former on the section 5 so that they cooperate to feed the strip only when the body sections 5 and 2 are in cooperation. The feed roll 13 is the driving roll operated by a crank 15 shown on the exterior in Figure 1.

After a length of film has been exposed on the support 7 to a greater or less extent according to the position of a curtain 16 described and claimed in my co-pending application, Serial No. 415,505, filed October 8, 1920, it is fed by the rollers 13 and 14 past the elements 17 and 18 of a severing mechanism that cuts it off at the edge of the exposed area and it is ready for development. For this purpose, it is received within a receptacle 19 arranged on the support 1 beneath the camera body and having a transverse slot 20 at its forward end positioned below the support 7 and the feed rolls 13 and 14 and alined with a slot 21 formed at this point in the bottom of the camera body between the lower rear edge of the forward section 2 and the lower forward edge of the rear section 5. A submerging rail is shown at 22 as the receptacle shown is a developing tray, but features of my invention are just as applicable if the receptacle were merely a storage tray.

The forward end of the receptacle 19 makes a light-tight joint with the camera body at a point forwardly of the slot 20 and along the rear edge of said slot I run an accurately surfaced metal rail 23 forming one element of a light seal between the receptacle and the swinging portion 5 of the body. This rail 23 is in the present form of an inverted channel bar and extends from side to side across the receptacle 19. The other element is a flange 24 on the bottom of the section 5 and when the latter is swung into normal position in cooperation with the section 2, the two elements 23 and 24 make an accurate fit so that the portion of the receptacle in the region of the slot 20 is shut off in a light-tight manner with the slot 21 and the interior of the body of the camera. This is the only point at which the body section 5 and the receptacle 19 engage each other and hence they may cooperate with great accuracy though readily permitting the body section 5 to be swung to the open position of Figure 1 which is done to make adjustments, re-fill the roll holder, etc.

Rearwardly of the forward slot 20 and the light seal 23 the receptacle 19 is closed by a top wall 25 which extends nearly to the rear end, as shown in Figure 1. At its rear edge is hinged a cover 26 having a flange 27 at its rear edge by means of which the cover may be raised slightly to permit the operator to insert his hand and withdraw the prints for fixing or other further treatment.

My arrangement of the print receiving receptacle and camera body I have found to be very efficient in excluding light at the one vulnerable point of admission to the interior of the camera and does away with the cumbersome hoods heretofore largely used in protecting the rear of the camera because of the presence of an open developing tray. The light seal is very simple and enduring as it may be made of metals not actively attacked by the solution, while the swinging movement of the back section 5 is not in the least interfered with.

I claim as my invention:

1. In a camera, the combination with a body and means for supporting sensitive material in the focal plane thereof, of a receptacle for exposed material arranged below the body and provided with an opening for the introduction of such material, the film support and receptacle being relatively movable, and sealing elements on the film support and adjacent to the opening in the receptacle respectively, adapted to cooperate in a light tight manner when these members are in normal relative positions.

2. In a camera, the combination with a body having a fixed forward portion and a movable rearward portion cooperating therewith, the latter comprising a film support in the focal plane of the camera and means for feeding sensitive material downwardly over said support, of a fixed receptacle for exposed material arranged below the body and provided with a slot below the film support to receive such material therefrom, and sealing elements on the rearward body portion and adjacent to the opening in the receptacle respectively adapted to cooperate in a light tight manner when the two portions of the body are in cooperative positions.

3. In a camera, the combination with a body having a fixed forward portion enclosing the exposure chamber and a swingingly connected back portion cooperating therewith and provided with a roll holder, a support for sensitive material in the focal plane of the camera, feeding devices for such material at the base of the support and a severing device adjacent to the feeding devices, of a fixed receptacle for exposed material arranged below the body and provided with a slot to receive sensitive material from the feeding devices, and sealing elements on the swinging body portion and along the rear edges of the slot in the receptacle, respectively, adapted to cooperate in a light tight manner when the two portions of the body are in cooperative positions.

4. In a camera, the combination with a body and means for supporting sensitive material in the focal plane thereof, of a receptacle for exposed material arranged below the body and provided with a forward opening for the introduction of such material, with a top, and with a rearward opening having a light tight cover through which the prints are removed, the film support and receptacle being relatively movable, and sealing elements on the film support and adjacent to the opening in the receptacle, respectively, adapted to cooperate in a light tight manner when these members are in normal relative positions.

JOHN S. GREENE.